United States Patent [19]

Damji et al.

[11] Patent Number: 5,749,028
[45] Date of Patent: May 5, 1998

[54] MULTI-SIZE PHOTORECEPTOR FLANGE BEARING

[75] Inventors: Dhirendra C. Damji; Richard W. Herzog. both of Webster, N.Y.

[73] Assignee: Xerox Corporation. Stamford, Conn.

[21] Appl. No.: 672,344

[22] Filed: Jun. 26, 1996

[51] Int. Cl.[6] ................................................. G03G 21/00
[52] U.S. Cl. ........................................ 399/117; 392/18
[58] Field of Search ................................. 399/117, 116, 399/411; 492/18, 47

[56] References Cited

U.S. PATENT DOCUMENTS

| | | | |
|---|---|---|---|
| 3,994,053 | 11/1976 | Hunt | 29/123 |
| 4,040,157 | 8/1977 | Shanly | 29/123 |
| 4,105,345 | 8/1978 | Van Wagner | 403/24 |
| 4,120,576 | 10/1978 | Babish | 355/3 DR |
| 4,400,077 | 8/1983 | Kozuka et al. | 355/3 DR |
| 4,449,809 | 5/1984 | Tamura . | |
| 4,561,763 | 12/1985 | Basch | 355/3 DR |
| 4,621,919 | 11/1986 | Nitanda et al. | 355/3 DR |
| 4,839,690 | 6/1989 | Onoda et al. . | |
| 4,878,091 | 10/1989 | Morita et al. | 355/260 |
| 4,941,018 | 7/1990 | Kasamura et al. | 355/245 |
| 4,954,844 | 9/1990 | Morita et al. | 355/260 |
| 4,996,566 | 2/1991 | Morita et al. | 355/246 |
| 5,107,304 | 4/1992 | Haneda et al. | 355/296 |
| 5,128,715 | 7/1992 | Fururama et al. . | |
| 5,151,737 | 9/1992 | Johnson et al. | 355/211 |
| 5,347,343 | 9/1994 | Ohtsuka et al. . | |
| 5,357,321 | 10/1994 | Stenzel et al. | 355/211 |
| 5,402,207 | 3/1995 | Michlin | 399/117 |
| 5,444,516 | 8/1995 | Michlin et al. | 399/117 |
| 5,465,136 | 11/1995 | Watanabe | 355/210 |

Primary Examiner—R. L. Moses
Attorney, Agent, or Firm—John S. Wagley

[57] ABSTRACT

A bearing for supporting a member in an electrophotographic printing machine of the type having a latent image recorded in a photoconductive drum and for alternatively receiving at least a first shaft and a second shaft is provided. The first shaft has a shape substantially physically different from the second shaft. The bearing includes a body operably associated with the member, a first feature operably associated with the body for supporting the first shaft, and a second feature operably associated with the body for supporting the second shaft, whereby the bearing may accommodate both of the two shafts.

27 Claims, 6 Drawing Sheets

MULTI-SIZE PHOTORECEPTOR FLANGE BEARING

The present invention relates to photoconductive drums used in electrophotographic printing machines. More particularly, the invention relates to bearings for supporting the photoconductive drum.

BACKGROUND OF THE INVENTION

A photoconductive member is a cylindrical or belt-like substrate used in an electrophotographic printing machine. A substrate is coated with one or more layers of a photoconductive material, i.e., a material whose electrical conductivity changes upon illumination. The photoconductive member includes, for example, an aluminum cylinder having a thin layer of a photoconductive organic compound thereon. In electrophotographic printing, an electrical potential is applied across the photoconductive layer and then exposed to light of an image. The electrical potential of the photoconductive layer decays at the portions irradiated by the light, leaving a distribution of electrostatic charge corresponding to the dark areas of the projected image. The electrostatic latent image is made visible by development with a suitable powder.

Typically, the photoconductive surface of the photoconductive drum has a surface life significantly less than that of the copier. Typical life of a photoconductive surface of a photoconductive member is approximately 20,000 copies. Thus, the photoconductive drum is replaced several times during the life of the machine. The photoconductive drum may either be an individual component that is replaced in the machine or more commonly contained within a housing, typically referred to as a CRU (customer replaceable unit). The photoconductive member is enclosed within the CRU to protect the photoconductive member from exposure to light and to protect it from damage during assembly into the copier.

The photoconductive drum is required to rotate within the copier and this is typically accomplished through a hub extending outwardly from an end of the photoconductive drum. OEM (original equipment manufacturers) often have various size shafts to which an opening in the hub of the photoconductive drum is engaged to provide the rotation. The shafts of the copiers typically have a cylindrical configuration with a specified diameter and length. The hub of the photoconductive drum therefore matingly fits with the shaft of the copier.

For low volume copiers (those which make for example 15 cpm or less) typically have photoconductive drums with one of a few standard diameters and lengths. This is because the length of the photoconductive drum determines the width of substrate that may be printed (copy paper used), for example, an 8½ by 11 inch sheet of paper. To permit copy in both length and width orientations, the photoconductive drum is thus slightly larger than 11 inches in length. The diameter of the photoconductive drum is typically in the order of one to two inches.

Many different photoconductive compositions may be utilized in copiers. While some of the photoconductive compositions have different physical characteristics, such as different colors, many of the compositions are physically similar. Distinguishing the respectively photoconductive drums is thus a major problem. Segregating identical photoconductive drums within a manufacturing facility represents one particular problem. A second problem is assuring that the proper photoconductive drum is placed within a machine when the photoconductive drum is replaced.

Further complications are involved in that OEM copier manufacturers may each have their own particular drive shaft diameters even for machines that utilize a photoconductive drum manufactured of the same photoconductive material. Therefore, often different OEM manufacturers will have their own individual photoconductive drums which differ from each other only in the adaptors required for the different drive shafts of the respective copiers. Manufacturers of photoconductive drums typically manufacture the drums for several different OEM manufacturers. Therefore, these photoconductive drum manufacturers may produce small runs of a variety of different photoconductive drums. This results in small runs of many different photoconductive drums and respective large quantities of different drums in inventory.

Furthermore, many different photoconductive drums differing only in the photoconductive material may be hard to visually distinguish. While some may be made of different colors, others have the same color and are only distinguishable by a label attached thereto. The use of the similar photoconductive drums creates segregation problems within a manufacturing facility and quality and reliability problems during servicing of the copiers with uncertainty as to whether the photoreceptive drum has been replaced with the proper drum. Typically, any one of several photoconductive drums may be inserted into a copy machine needing servicing, while only one of these photoconductive drums may provide proper quality and service life to the customer.

This invention is intended to address at least some of the aforementioned problems.

The following disclosures may be relevant to various aspects of the present invention:

U.S. Pat. No. A-5,465,136
Patentee: Watanabe
Issue Date: November 7, 1994
U.S. Pat. No. A-5,357,321
Patentee: Stenzel et al.
Issue Date: October 18, 1994
U.S. Pat. No. A-5,151,737
Patentee: Johnson et al
Issue Date: September 29, 1992
U.S. Pat. No. A-5,107,304
Patentee: Haneda et al.
Issue Date: April 21, 1992
U.S. Pat. No. A-4,996,566
Patentee: Morita et al.
Issue Date: February 26, 1991
U.S. Pat. No. A-4,954,844
Patentee: Morita et al.
Issue Date: September 4, 1990
U.S. Pat. No. A-4,941,018
Patentee: Kasamura et al.
Issue Date: July 10, 1990
U.S. Pat. No. A-4,878,091
Patentee: Morita et al.
Issue Date: October 31, 1989
U.S. Pat. No. A-4,621,919
Patentee: Nitanda et al.
Issue Date: November 11, 1986
U.S. Pat. No. A-4,561,763
Patentee: Basch
Issue Date: December 31, 1985
U.S. Pat. No. A-4,400,077
Patentee: Kozuka et al.
Issue Date: August 23, 1983
U.S. Pat. No. A-4,120,576
Patentee: Babish
Issue Date: October 17, 1978
U.S. Pat. No. A-4,105,345
Patentee: Van Wagner
Issue Date: August 8, 1978

3
-continued

U.S. Pat. No. A-4,040,157
Patentee: Shanly
Issue Date: August 9, 1977
U.S. Pat. No. A-3,994,053
Patentee: Hunt
Issue Date: November 30, 1976

The relevant portions of the foregoing disclosures may be briefly summarized as follows:

U.S. Pat. No. 5,465,136 to Watanabe discloses a process cartridge which is detachable from an image forming apparatus. The process cartridge includes a charging roll that is in contact with a photosensitive drum when the cartridge is operational. Pressure releasing pieces separate the roll from the drum. Gripping members contact the frame when the cartridge would be in contact with the drum to prevent damage to the drum during installation.

U.S. Pat. No. 5,357,321 to Stenzel et al. discloses a drum supporting hub including a disc shaped member having a circular periphery. A hole extends axially through the center of the disc shaped member and a long thin electrically conductive resilient s-shaped member is trapped between flared edges and an axle shaft and the ends of the s-shaped member contact the inner periphery of the disc shaped member.

U.S. Pat. No. 5,151,737 to Johnson et al. discloses a hollow cylindrical shell having an axial slit. Axial ribs extend inwardly from the shell. Conical wedges are fitted to the ends of the shell and the conical surface of the wedges contact chamfers on the ribs. A shaft is slidably fitted to an axial opening in the wedges. A nut on an end of the shaft is used to draw the wedges together causing the shell to expand.

U.S. Pat. No. 5,107,304 to Haneda et al. discloses a multi-color image forming apparatus having an plurality of developing devices. Each of the developing devices are mounting in a specific position in the apparatus. Fool proof mechanisms are taken to prevent the developing device to be mounted in an improper location.

U.S. Pat. No. 4,996,566 to Morita et al. discloses a multi-color image forming apparatus having an plurality of developing units. Each of the developing devices are mounting in a specific position in the apparatus. In case an operator makes a mistake when the developing units are inserted into the apparatus, a fool proof mechanism is used to prevent the developing device to be mounted in an improper location.

U.S. Pat. No. 4,954,844 to Morita et al. discloses a multi-color image forming apparatus having an plurality of developing units. Each of the developing devices are mounting in a specific position in the apparatus. In case an operator makes a mistake when the developing units are inserted into the apparatus, a fool proofing device is used. In such a device pins are provided on the front faces of the in different vertical positions on the of the developing units. The pins mate with grooves to prevent the developing device to be mounted in an improper location.

U.S. Pat. No. 4,941,7018 to Kasamura et al. discloses an image forming apparatus having a developing unit and a photosensitive member. The developing unit is mounted slidably by a pair of guiding passages. The driving passage nearer the photoresistive member is narrower than the other passage to prevent the developer unit to be incorrectly mounted.

U.S. Pat. No. 4,878,091 to Morita et al. discloses a multi-color image forming apparatus having an plurality of developing units. Each of the developing devices are mounting in a specific position in the apparatus. In case an operator makes a mistake when the developing units are inserted into the apparatus, pins are provided on the front faces of the in different vertical positions on the of the developing units. The pins mate with grooves to prevent the developing device to be mounted in an improper location.

U.S. Pat. No. 4,621,919 to Nitanda et al. discloses a photoreceptive drum having a face integrally formed on one side of the drum. An integrally formed shaft extends from the integrally formed face.

U.S. Pat. No. 4,561,763 to Basch discloses a cylindrical drum assembly including a pair of drum supporting hubs positioned on the ends of a cylindrical drum. The hubs include an annular ring having resilient finger extending from the ring. An external recess on a disc shaped end plate fits inside the fingers while the inner periphery of the cylindrical drum fits outside the fingers. The fingers connect the drum to the plate.

U.S. Pat. No. 4,400,077 to Kozuka et al. discloses a photosensitive drum assembly having a cylindrical drum and two disc shaped flanges positioned on the ends of the drum. The flanges each include a lip which is closely fitted to the external periphery of the drum. Connecting rods interconnect the flanges.

U.S. Pat. No. 4,120,576 to Babish discloses a drum support apparatus for supporting a cylindrical drum. The apparatus includes a pair of hubs each having a central stem. A shaft interconnects the hubs and has a loosely fitted tube over the shaft. The periphery of the stem fits with the inner periphery of the tube. Tabs on the shaft interconnect with a slot in the stem.

U.S. Pat. No. 4,105,345 to Van Wagner discloses a drum support assembly including a cylindrical drum having spaced apart internal grooves and a pair of hubs. The hubs each have four equally spaced radially sliding lock plates with an outer edge which matingly fits into the grooves. A centrally located shaft is secured to the hubs and interconnects them.

U.S. Pat. No. 4,040,157 to Shanly discloses a drum support assembly a cylindrical hub and two conical shaped hubs. The hubs include equally spaced lobes on the periphery of the hubs which mate with an internal periphery on the ends of the hub. A shaft is fitted to the center of the hubs and three equally spaced tie rods interconnect the hubs.

U.S. Pat. No. 3,994,053 to Hunt discloses a drum support assembly a cylindrical hub and two conical shaped hubs. The hubs include equally spaced lobes on the periphery of the hubs which mate with an internal periphery on the ends of the hub. A shaft is fitted to the center of the hubs and three equally spaced tie rods interconnect the hubs.

All of the references cited herein above are incorporated by reference for their teachings.

SUMMARY OF THE INVENTION

In accordance with one aspect of the present invention, there is in provided a bearing for supporting a member in an electrophotographic printing machine of the type having a latent image recorded in a photoconductive drum and for alternatively receiving at least a first shaft and a second shaft. The first shaft has a shape substantially physically different from the second shaft. The bearing includes a body operably associated with the member, a first feature operably associated with the body for supporting the first shaft, and a second feature operably associated with the body for supporting the second shaft, whereby the bearing may accommodate both of the two shafts.

In accordance with another aspect of the present invention, there is provided a customer replaceable unit including a processing station for use in a printing machine. The customer replacement unit includes a bearing for supporting a moving member on a support structure and for alternatively receiving at least a first shaft and a second shaft. The first shaft has a shape substantially physically different from the second shaft. The bearing includes a body operably associated with the member, a first feature operably associated with the body for supporting the first shaft, and a second feature operably associated with the body for supporting the second shaft, whereby the bearing may accommodate both of the two shafts.

In accordance with further aspect of the present invention, there is provided an electrophotographic printing machine of the type having a latent image recorded in a photoconductive drum. The machine includes a bearing for supporting the drum and for alternatively receiving at least a first shaft and a second shaft. The bearing includes a body operably associated with the drum, a first feature operably associated with the body for supporting the first shaft, and a second feature operably associated with the body for supporting the second shaft, whereby the bearing may accommodate both of the two shafts.

These and other aspects of the invention will become apparent from the following descriptions to illustrate a preferred embodiment of the invention read in conjunction with the accompanying drawings.

BRIEF DESCRIPTION OF THE DRAWINGS

The invention will be described in detail herein with reference to the following figures in which like reference numerals denote like elements and wherein.

Figure 1A:
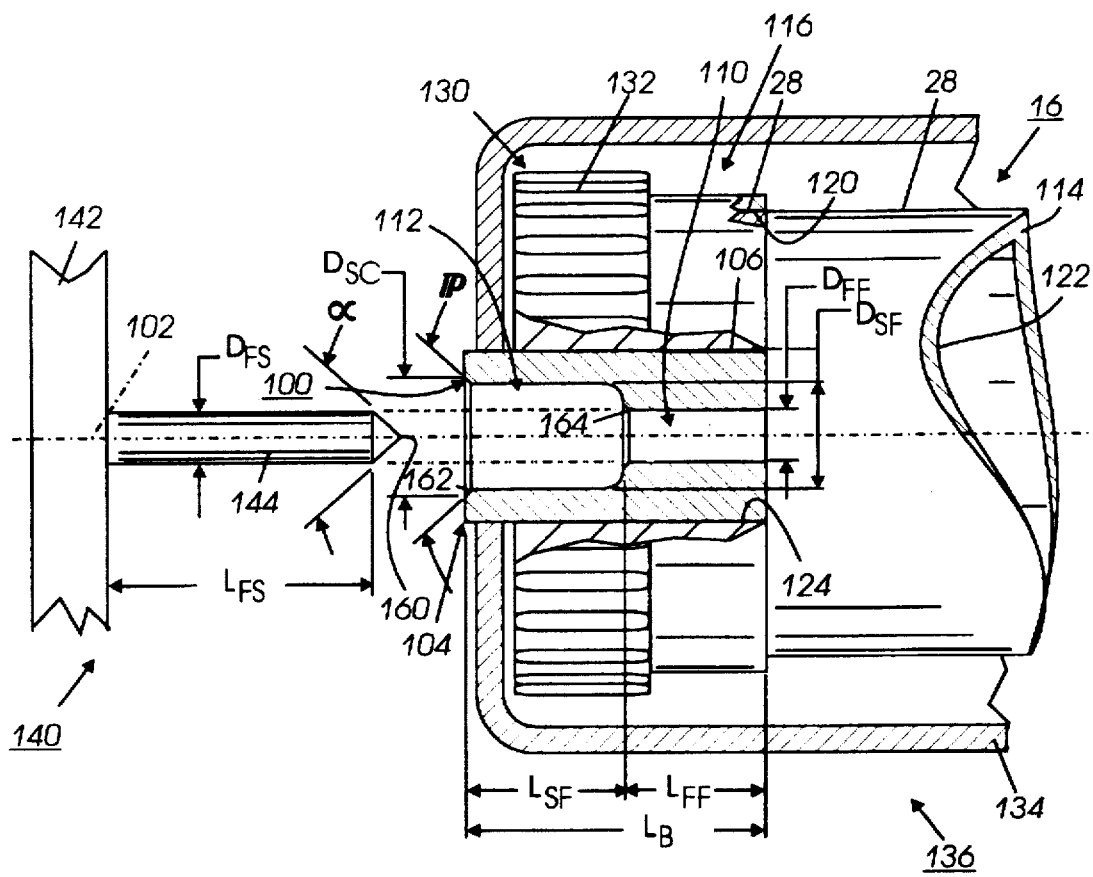
FIG. 1A is a partial plan view of a photoreceptor drum in a CRU including a multi-size photoreceptor flange bearing according to the present invention.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Referring now to the drawings where the showings are for the purpose of describing an embodiment of the invention and not for limiting same, initially, the principle of the invention will be discussed. While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the illustrative electrophotographic printing machine incorporating the features of the present invention therein, reference is made to the drawings. In the drawings, like reference numerals have been used throughout to designate identical elements. FIG. 6 schematically depicts the various components of an electrophotographic printing machine incorporating the corona discharge device of the present invention therein. Although the corona discharge device of the present invention is particularly well adapted for use in the illustrative printing machine, it will become evident that these corona discharge devices are equally well suited for use in a wide variety of uses and are not necessarily limited in their application to the particular embodiments shown herein.

Referring now to FIG. 6, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 26 rotates drum 16 to advance drum 16 in the direction of arrow 18. Drum 16 is coupled to motor 26, by suitable means such as a drive.

Initially successive portions of drum 16 pass through charging station A. At charging station A, a corona generating device, indicated generally by the reference numeral 30, charges the drum 16 to a selectively high uniform electrical potential. The electrical potential is normally opposite in sign to the charge of the toner. Depending on the toner chemical composition, the potential may be positive or negative. Any suitable control, well known in the art, may be employed for controlling the corona generating device 30.

A document 34 to be reproduced is placed on a platen 22, located at imaging station B, where it is illuminated in a known manner by a light source such as a lamp 24 with a photo spectral output matching the photo spectral sensitivity of the photoconductor. The document thus exposed is imaged onto the drum 16 by a system of mirrors 26 and lens 27, as shown. The optical image selectively discharges surface 28 of the drum 16 in an image configuration whereby an electrostatic latent image 32 of the original document is recorded on the drum 16 at the imaging station B.

At development station C, a development system or unit, indicated generally by the reference numeral 36 advances developer materials into contact with the electrostatic latent images. The developer unit 36 includes a device to advance developer material into contact with the latent image.

The developer unit 36, in the direction of movement of drum 16 as indicated by arrow 18, develops the charged image areas of the photoconductive surface 28. This developer unit contains black developer, for example, material 44 having a triboelectric charge such that the black toner is urged towards charged areas of the latent image by the electrostatic field existing between the photoconductive surface and the electrically biased developer rolls in the developer unit which are connected to bias power supply 42.

A sheet of support material 58 is moved into contact with the toner image at transfer station D. The sheet of support material 58 is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, binding, inverting and returning the sheet for duplexing and the like.

After the sheet of support material is separated from the photoconductive surface of drum 16, the residual toner particles carried by image and the non-image areas on the photoconductive surface are removed at cleaning station F. The cleaning station F includes a blade 74.

It is believed that the foregoing description is sufficient for purposes of the present application to illustrate the general operation of an electrophotographic printing machine incorporating the development apparatus of the present invention therein.

According to the present invention and referring to FIG. 1A, multi-size photoreceptor flange bearing 100 is shown.

Bearing 100 is made of any suitable, durable material such as a metal or a durable synthetic material, for example a plastic. Preferably, the bearing is electrically conductive. The bearing also has inherent lubricating qualities to permit low friction and low wear operation. For example, the bearing 100 may be made of a bronze, for example, a powder metal sintered material, i.e. bronze. Preferably, the bronze bearing 100 is impregnated with a lubricating material, i.e. carbon. It should be appreciated, however, that the bearing 100 may be made of an alternate material, i.e. a plastic impregnated with carbon to provide the lubricating and electrically conductive properties.

The bearing 100 may have any suitable shape which permits the rotational motion of the member 16 in the form of for example photoreceptor drum 16 about axis 102. For example, as shown in FIG. 1A, the bearing 100 has a body 104 which defines a cylindrical periphery 106 thereof. The bearing body 104 defines a first feature 110 as well as a second feature 112.

The bearing 100 supports the member 16 which is typically in the form of a photoconductive drum. The bearing 100 is connected to the drum 16 in any suitable fashion. For example, the drum 16 may include a substrate 114 having a general tubular shape. The substrate is made of any suitable material and preferably is electrically conductive, for example, aluminum. The periphery 28 of the substrate 114 is preferably coated with a photoconductive material, i.e. selenium or a organic material. The bearing 100 is connected to the drum 16 in any suitable fashion. For example, hub 116 may be used to connect the drum 16 to the bearing 100. The hub 116 is secured to the photoreceptor drum 16 in any suitable fashion. For example, as shown in FIG. 1A, the hub 116 includes a hub large bore 120 to which periphery 28 of the drum 16 is matingly fitted. It should be appreciated, however, that the hub 116 may include a stem (not shown) which would matingly fit to drum bore 122 of the substrate 14. The hub 116 is secured to the bearing 100 in any suitable fashion. For example, the hub 116 may include a small bore 124 which is matingly fitted to periphery 106 of the bearing 100. To provide for the rotation of the photoconductive drum 16, the hub 116 may include a gear 130 located on the hub 116. The gear 130 may include a plurality of teeth 132. The teeth 132 may have any suitable shape and may, for example, be as shown in FIG. 1A, spur or helical teeth. The gear 130 mates with a driving gear (not shown) which drives the photoconductive drum 16. The hub 116 is made of any suitable, durable material, for example, aluminum. It should be appreciated that hub 116 may also be made of a organic material, i.e. a plastic.

The bearing 100 is operably connected to housing 134. The housing 134 may have any suitable shape for containing the photoconductive drum 16. As stated earlier the photoconductive drum 16 is a consumable item and will eventually require replacement. In order to assist in the placement of the photoconductive drum recently the photoconductive drum is contained within a module or unit in the form of a CRU (customer replaceable unit) generally referred to in FIG. 1A as numeral 136. The housing 134 thus forms part of the CRU 136. When the housing 134 is used as part of a CRU, the housing has a generally cylindrical shape slightly larger than the drum 16. The housing 134 may be made of any suitable durable material for example a plastic in particular a strong plastic perhaps reinforced with fibers for example nylon or carbon graphite material.

The CRU 136 is removable mounted to a first copy machine 140. The CRU 136 may be mounted to the machine 140 in any suitable fashion, for example as shown in FIG.

1A, the machine 140 includes frame 142 from which first support 144 extends. The CRU 136 is thus removably mounted on support 144.

Figure 1B:
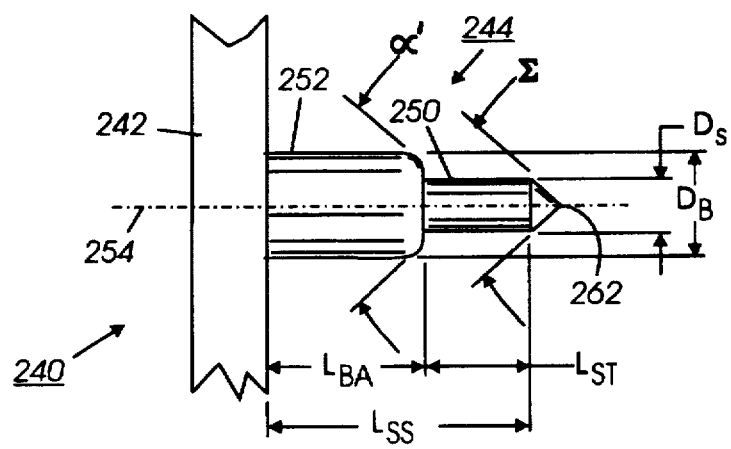
FIG. 1B is a partial plan view of a multi-step shaft for engagement with the multi-size photoreceptor flange bearing of FIG. 1.
Figure 2:
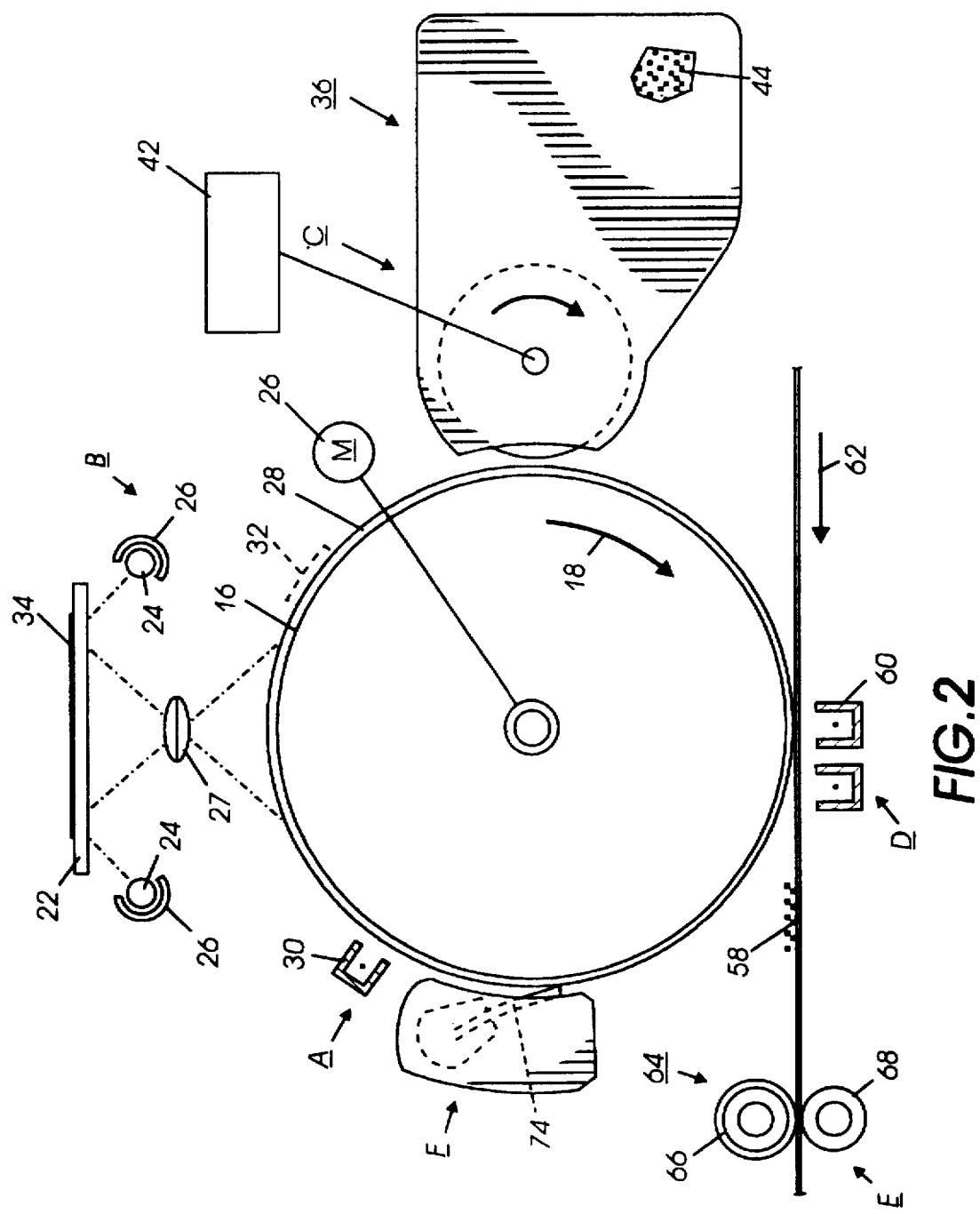
FIG. 2 is a schematic elevational view of an illustrative electrophotographic printing machine incorporating the bearing of the present invention therein.

According to the present invention and referring to FIG. 1B, the bearing 100 serves to permit the mounting of CRU 136 into the first machine 140 which has the first support 144 extending from the frame member 142 (see FIG. 1A) as well as to mount the CRU 136 into machine 240 which machine 240 includes a second support 244 extending from a second frame member 242. More simply stated, the bearing 100 accepts both the first support 144 and the second support 244 permitting the CRU 136 to fit into both machines 140 and 240.

Referring again to FIG. 1A, the bearing 100 includes the first feature 1 10 which cooperates with the first support 144 to permit the mounting of the CRU 136 into machine 140. The support 144 and the first feature 110 may have any suitable shape to permit cooperation with each other. For example, as shown in FIG. 1A, the first feature 110 may be in the form of a small bore. The bore 110 may be cylindrical and be defined by diameter $D_{FF}$. The first support 144 may be in the form of a first stem or first shaft and be cylindrical with a diameter $D_{FS}$. The diameter $D_{FS}$ of the first shaft 144 is slightly smaller than the diameter $D_{FF}$ of the small bore 110 of the bearing 100 to permit insertion therewith.

The first shaft 144 has a length $L_{FS}$ which is similar in length to length $L_B$ of the bearing 100.

Referring now to FIGS. 1 A and 1B, the second feature 112 of the bearing 100 is in the form of a counterbore having a diameter $D_{SF}$. The small second feature 112 of the bearing 100 is matingly fitted to the second support 244. The second support 244 may have any suitable size and shape to mate with the second feature 112 but preferably, according to FIG. 1B, the second support 244 is in the form of a multi-diameter shaft. The multi-diameter shaft 244 includes a cylindrical stem 250 which extends from a cylindrical base 252. The cylindrical stem 250 and cylindrical base 252 are concentric about axis 254. The cylindrical base 252 has a diameter $D_B$ which matingly fits into the second feature 112 of the bearing 100.

The second feature 112 is preferably in the form of a cylindrical counterbore having a diameter $D_{SF}$. Diameter $D_B$ of the base 252 is slightly smaller than diameter DSF of the second feature 112 of the bearing 100 to permit cooperation therewith. The cylindrical stem 250 has a diameter $D_S$ which is similar to diameter $D_{FS}$ of the first shaft 144. The cylindrical base 252 has a length $L_{BA}$ which is similar to length $L_{SF}$ of the second feature 112 of the bearing 100. The cylindrical stem 250 extends length LST from the cylindrical base 252 and extends length Lss from frame member 242. The length $L_{ST}$ of the cylindrical stem 250 is roughly equivalent to the length $L_{FF}$ of the first feature 110.

The cylindrical stem 250 and the cylindrical base 252 are concentric with each other to an accurate tolerance of say, for example, 0.03 mm. Likewise, the counterbore 1 12 and the small bore 110 of the bearing 100 are concentric to each other to a small tolerance of for example 0.03 mm. The use of a cast sintered metal bearing 100 inherently provides for the accurate concentricity of the counterbore 112 to the small bore 110. Likewise, grinding or other manufacturing techniques can provide for the accurate concentricity of the cylindrical base 252 to the cylindrical stem 250.

Referring again to FIG. 1A, to assist in the assembly of the CRU 136 onto the support 144, the shaft 144 may include a tapered point 160 which is defined by an included angle of approximately 30 to 150 degrees with 90 degrees being preferable. The bearing 100 likewise includes a lead-in chamfer 162 which defines a chamfer diameter $D_{SC}$ slightly larger than $D_{SF}$ of the bore. The chamfer 162 is defined further by an included angle II of for example, 150 to 30 degrees with 90 degrees being preferred. The transition between the second feature 112 and the first feature 110 preferably includes a lead-in chamfer 164 which assists in the insertion of the first shaft 144 and the second shaft 244.

Referring again to FIG. 1B, the cylindrical base 252 includes a lead-in chamfer 260 which is defined by angle Angle has an included angle of for example 150 to 30 degrees with 90 degrees being preferred.

Cylindrical stem 250 includes tapered point 262 which is defined by included angle Σ. Included angle Σ may have any suitable angle of for example 30 to 150 degrees with 90 degrees being preferred.

Figure 3:
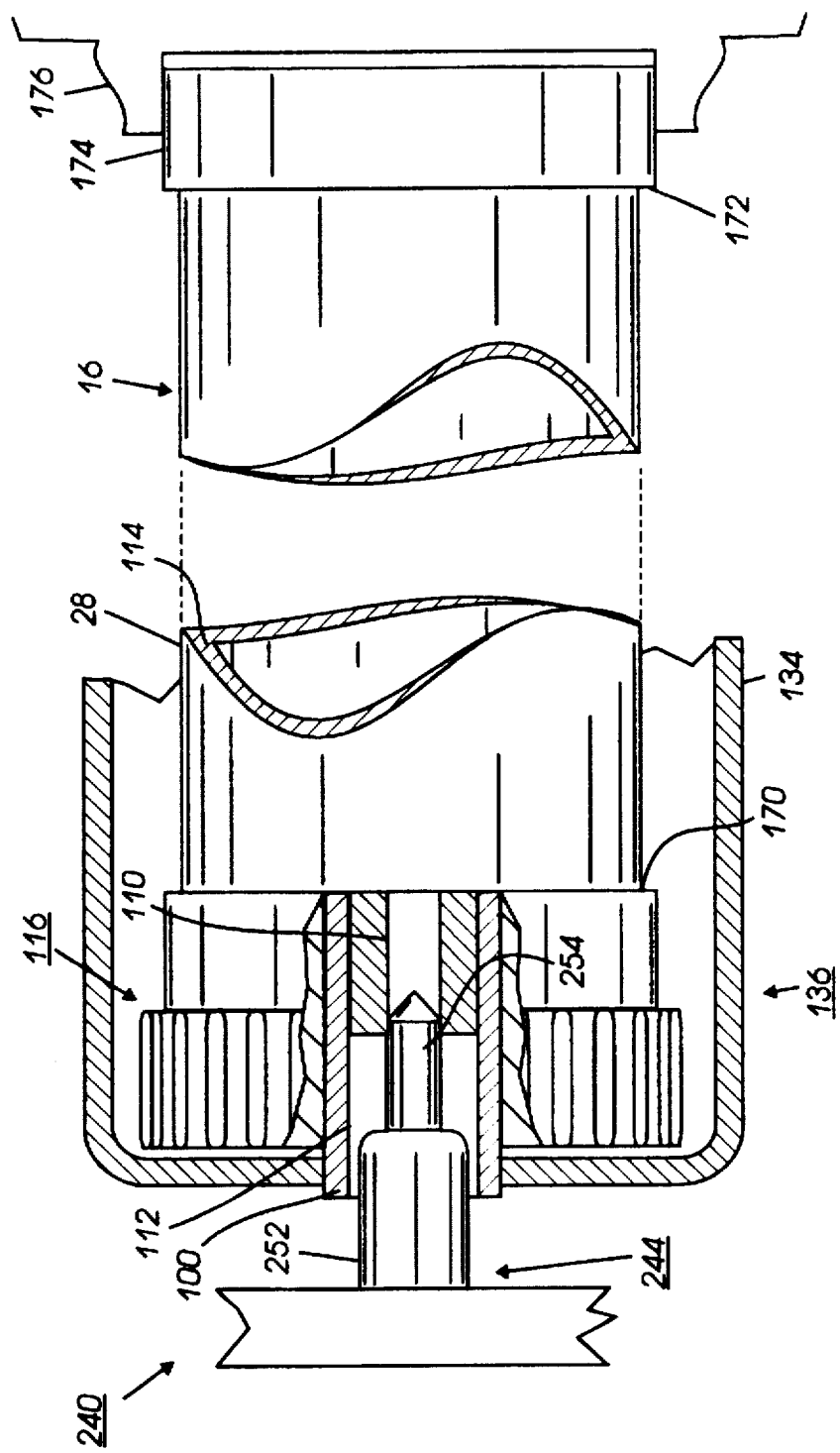
FIG. 3 is a partial plan view of a multi-step shaft in engagement with the multi-size photoreceptor flange bearing of FIG. 1.

Referring now to FIG. 3, the CRU 136 is shown installed into machine 240. The photoreceptive drum 16 includes the first hub 116 extending from first end 170 of the drum 16 as well as second hub 174 extending from second end 172 of the drum 16. The photoreceptive drum 16 25 is supported at second end 172 in any suitable fashion, for example, as shown in FIG. 3, the second hub 174 is fitted into pot 176. It should be appreciated that other mounting situations, for example, a bearing sleeve fitted into a shaft as similar to bearing 100 and shaft 244 may be utilized to support second hub 174.

Figure 4:
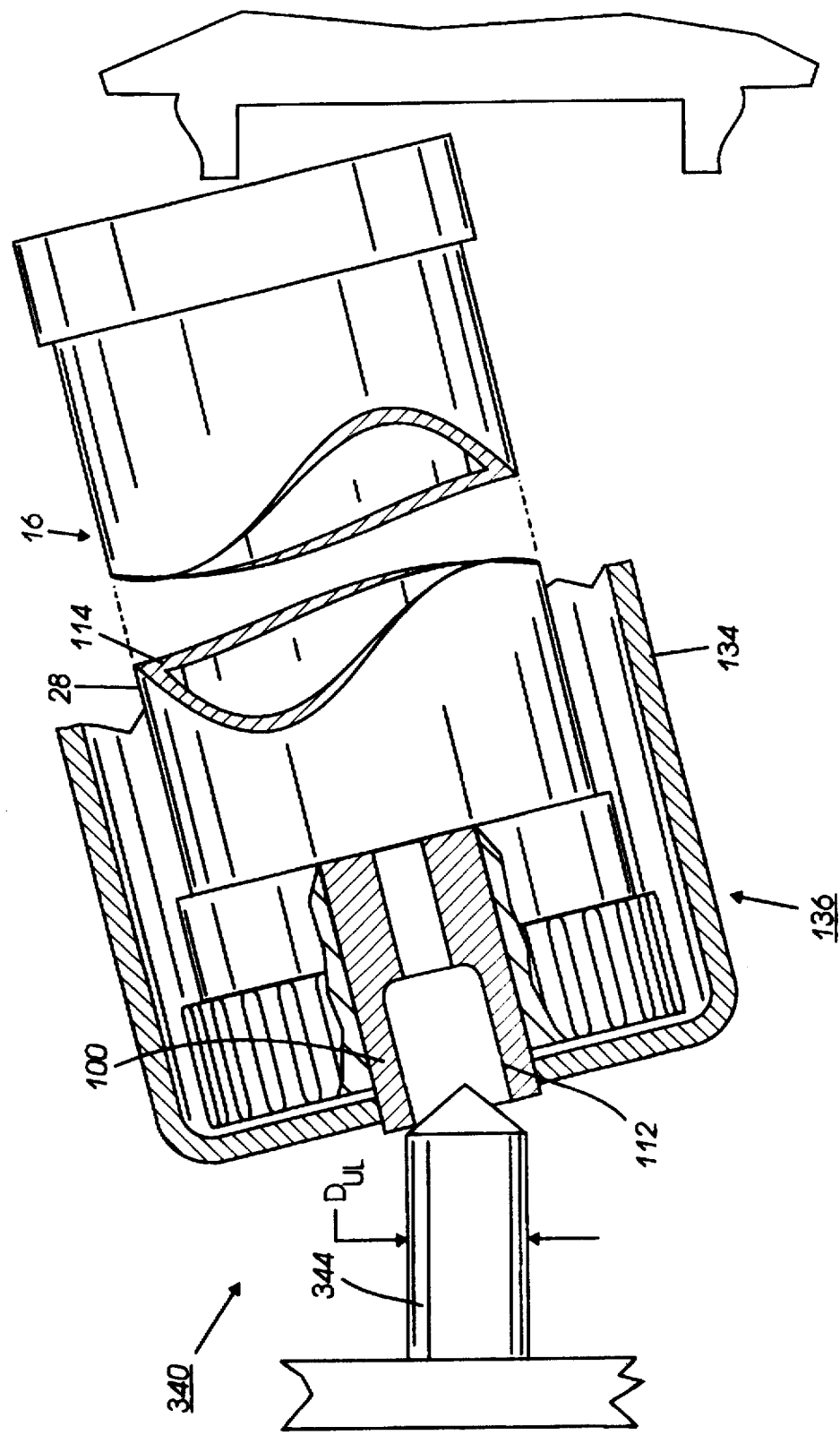
FIG. 4 is a partial plan view of the CRU of FIG. 1A unsuccessfully attempted to be installed in an improper copy machine.

Referring now to FIG. 4, cartridge replaceable unit 136 is shown trying to be installed into machine 340. Machine 340 includes shaft 344 which has a diameter DVL which is significantly larger than diameter DSF Of the bearing 100. It is thus obvious that CRU 136 may not be installed into machine 340. Therefore, the bearing 100 serves to foolproof or prevent the installation of CRU 136 into machine 340.

Figure 5:
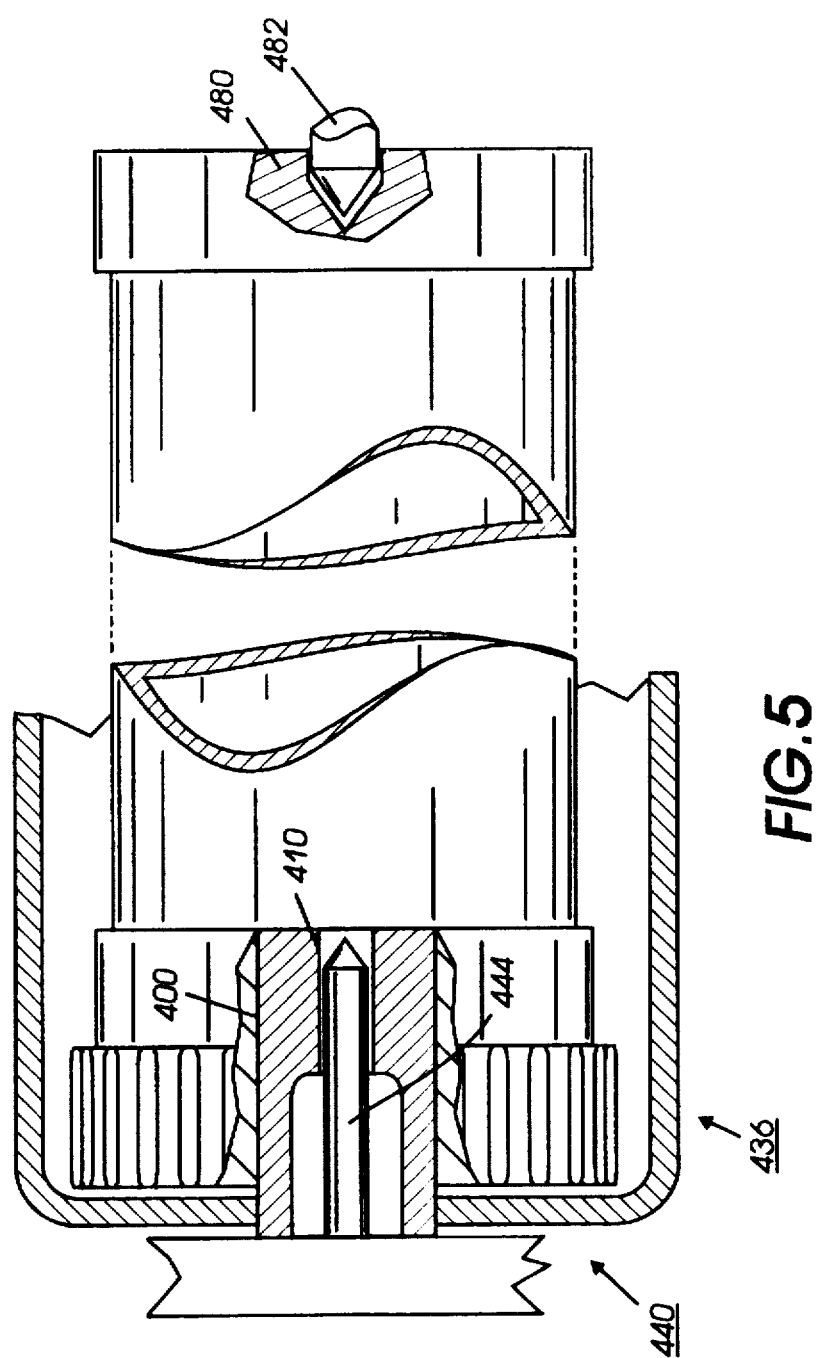
FIG. 5 is a partial plan view of a CRU incorporating the multi-size photoreceptor flange bearing according to the present invention with an alternate second hub support configuration.

Referring now to FIG. 5, CRU 436 is shown installed into machine 440. CRU 436 is very similar to CRU 136 of FIGS. 1 and 4 except that second hub 474 is different than second hub 174 of FIG. 3 in that second hub 474 includes bearing 480 which matingly fits with second end shaft 482. Further, CRU 436 includes shaft 444 which matingly fits with first feature 410 of bearing 400.

Referring now to FIGS. 6A–6H, alternate support configurations are shown. CRU 136 as shown in FIGS. 3 and 4 as well as CRU 436 as shown in FIG. 5 may operate by having the hub rotate around the bearing or by having the shaft rotate about the bearing. Preferably, for the CRU 136 the bearing 100 rotates about shaft 144 for the CRU 136, while the bearing 400 rotates about shaft 444 in CRU 436. When relative rotation may be had between the bearing and the hub, no rotation between the shaft and the bearing is necessary. When the shaft and bearing are locked together, the shaft and bearing configurations as shown in FIGS. 6A–6H are permissible. As shown in FIGS. 6A–6H, the shaft may include a portion in the form of a polygon while the bearing may include a bore which mates with the polygon feature of the shaft.

Figure 6A:
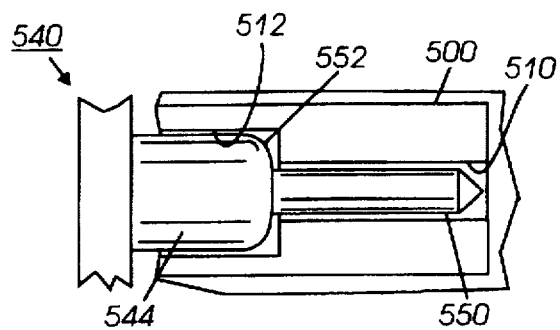
FIG. 6A is a partial plan view of a square shaft for engagement with a multi-size photoreceptor flange bearing according to the present invention.
Figure 6B:
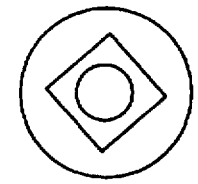
FIG. 6B is a partial end view of the square shaft of FIG. 6A.

Referring now to FIGS. 6A and 6B, shaft 544 is shown installed in bearing 500. Shaft 544 includes rectangular base 552 with a cylindrical stem 550 extending therefrom. The bearing 500 includes a cylindrical first feature 510 as well as a rectangular counterbore 512.

Figure 6C:
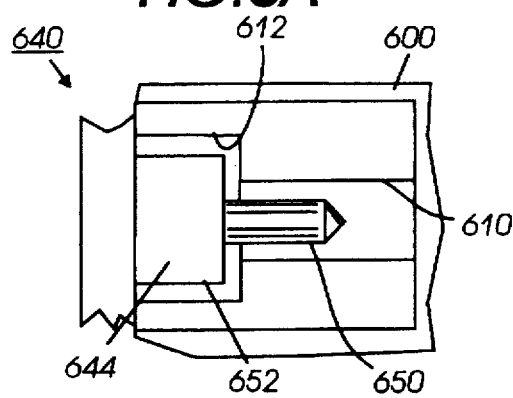
FIG. 6C is a partial plan view of a triangular shaft for engagement with a multi-size photoreceptor flange bearing according to the present invention.
Figure 6D:
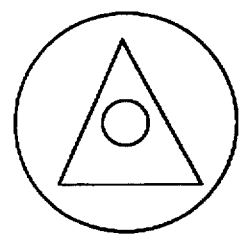
FIG. 6D is a partial end view of the triangular shaft of FIG. 6C.

Referring now to FIGS. 6C and 6D, shaft 644 is shown installed in bearing 600 on machine 640. The shaft 644 includes a cylindrical stem 650 extending from triangular base 652. The bearing 600 includes a cylindrical bore 610 as well as a triangularly shaped counterbore 612.

Figure 6E:
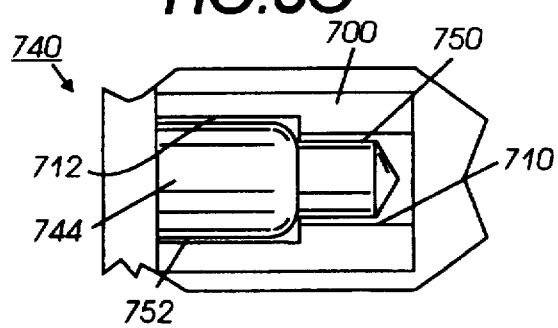
FIG. 6E is a partial plan view of a pentagon shaft for engagement with a multi-size photoreceptor flange bearing according to the present invention.
Figure 6F:
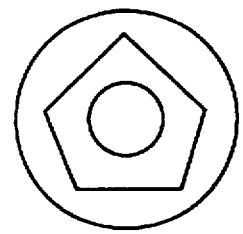
FIG. 6F is a partial end view of the triangular shaft of FIG. 6E.

Referring now to FIGS. 6E and 6F, shaft 744 is shown installed in bearing 700 on machine 740. The shaft 744 includes a cylindrical stem 750 extending from pentagon shaped base 752. The bearing 700 includes a cylindrical bore 710 as well as a pentagon shaped counterbore 712.

Figure 6G:
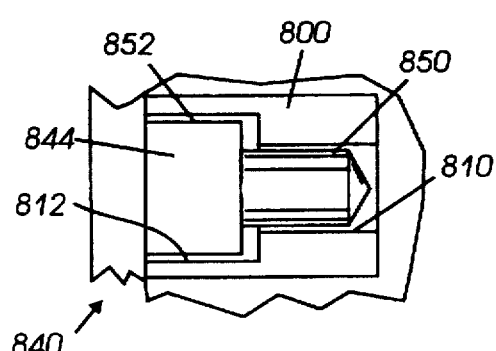
FIG. 6G is a partial plan view of a hexagonal shaft for engagement with a multi-size photoreceptor flange bearing according to the present invention.
Figure 6H:
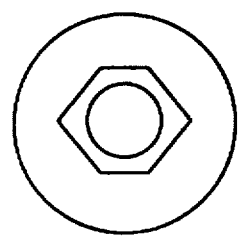
FIG. 6H is a partial end view of the hexagonal shaft of FIG. 6G.

Referring now to FIGS. 6G and 6H, shaft 844 is shown installed in bearing 800 on machine 840. The shaft 840 includes a cylindrical stem 850 extending from hexagonal base 852. The bearing 800 includes a cylindrical bore 810 as well as a hexagon shaped counterbore 812.

The shafts of FIGS. 6A–6H require a correspondingly matingly shaped bore to permit the assembly of the shaft into the bearing. This configuration is very helpful for foolproofing of the proper CRU into a copy machine. While the configuration shown in FIGS. 6A-6H require the rotation of the hub about the bearing, it should be appreciated that by replacing the polygon counterbore within the bearing with a counterbore within the housing the bearing 100 could rotate about the cylindrical stem obviating the need for a rotation between the bearing and the hub.

By providing a multi-size photoreceptor flange bearing, common photoreceptors can be used with machines having different size shafts.

By providing a multi-size photoreceptor flange bearing, common photoreceptors may be utilized reducing the number of different photoreceptors required for a cartridge replaceable unit.

By providing a multi-size photoreceptor flange bearing, common photoreceptors may be used reducing the number of different photoreceptors resulting in lower inventory, larger lot sizes, fewer changeovers, and thereby lower costs for the photoreceptors and cartridge replaceable units.

By providing a multi-size photoreceptor flange bearing manufactured from a cast sintered material, common photoreceptors can be used reducing the number of different photoreceptors with a minimal cost penalty for the multi-size bushing.

By providing a multi-size photoreceptor flange bearing with self-lubricating qualities, a CRU may be provided with improved life.

By providing a multi-size photoreceptor flange bearing having electrical conductivity, charge transfer can occur through the bearing of the CRU.

By providing multi-size photoconductive flange bearings, foolproofing of photoreceptors can be provided to prevent the installation of an improper photoconductor.

By providing a multi-size photoconductive flange bearings otherwise identical photoconductive drum can be distinguished by their stems.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A bearing for supporting a member in an electrophotographic printing machine of the type having a latent image recorded in a photoconductive drum and for alternatively receiving at least a first shaft and a second shaft, the first shaft having a shape substantially physically different from the second shaft, said bearing comprising:

a body operably associated with the member;

a first feature operably associated with said body for supporting the first shaft; and a second feature operably associated with said body for supporting the second shaft, whereby the bearing may accommodate both of the two shafts.

2. The bearing of claim 1, wherein:

the second shaft has a cylindrical base and a cylindrical stem extending concentrically therefrom; and said body defining a aperture therein, the aperture including a first bore matingly fittable to the stem and a second bore, concentric to the first bore and matingly fittable to the base.

3. The bearing of claim 2, wherein the first bore is concentric with the second bore within approximately 0.03 mm.

4. The bearing of claim 2, wherein the first bore is concentric with an external periphery of said body within approximately 0.03 mm.

5. The bearing of claim 2, wherein the first bore has a length along its rotational axis of approximately 30 to 70 percent of the length of the second bore along its rotational axis.

6. The bearing of claim 1, wherein said body comprises a self lubricating material.

7. The bearing of claim 1, wherein said self lubricating material comprises sintered bronze.

8. The bearing of claim 1, wherein said body comprises an electrically conductive material.

9. The bearing of claim 1, wherein said electrically conductive material comprises carbon.

10. A customer replaceable unit including a processing station for use in a printing machine, said customer replacement unit including a bearing for supporting a moving member on a support structure and for alternatively receiving at least a first shaft and a second shaft, the bearing comprising:

a body operably associated with the member; and a sleeve matingly fitted at least Partially within said body, said sleeve including a first feature operably associated with said sleeve for supporting the first shaft and a second feature operably associated with said sleeve for supporting the second shaft, whereby the bearing may accommodate both of the two shafts.

11. The customer replaceable unit of claim 10, wherein:

the second shaft has a cylindrical base and a cylindrical stem extending concentrically therefrom; and said sleeve defining a aperture therein, the aperture including a first bore matingly fitable to the stem and a second bore, concentric to the first bore and matingly fitable to the base.

12. The customer replaceable unit of claim 11, wherein the first bore is concentric with the second bore within approximately 0.03 mm.

13. The customer replaceable unit of claim 11, wherein the first bore is concentric with an external periphery of the sleeve within approximately 0.03 mm.

14. The customer replaceable unit of claim 11, wherein the first bore has a length along its rotational axis of approximately 30 to 70 percent of the length of the second bore along its rotational axis.

15. The customer replaceable unit of claim 10, wherein said sleeve comprises a self lubricating material.

16. The customer replaceable unit of claim 10, wherein said self lubricating material comprises sintered bronze.

17. The customer replaceable unit of claim 10, wherein said sleeve comprises an electrically conductive material.

18. The customer replaceable unit of claim 10, wherein said electrically conductive material comprises carbon.

19. An electrophotographic printing machine of the type having a latent image recorded in a photoconductive drum, said machine including a bearing for supporting the drum and for alternatively receiving at least a first shaft and a second shaft, the bearing comprising:

a body operably associated with the member; and a sleeve matingly fitted at least partially within said body, said sleeve including a first feature operably associated with said sleeve for supporting the first shaft and a second feature operably associated with said sleeve for supporting the second shaft, whereby the bearing may accommodate both of the two shafts.

20. The printing machine of claim 19, wherein:

the second shaft has a cylindrical base and a cylindrical stem extending concentrically therefrom; and said sleeve defining a aperture therein, the aperture including a first bore matingly fitable to the stem and a second bore, concentric to the first bore and matingly fitable to the base.

21. The printing machine of claim 20, wherein the first bore is concentric with the second bore within approximately 0.03 mm.

22. The printing machine of claim 20, wherein the first bore is concentric with an external periphery of the sleeve within approximately 0.03 mm.

23. The printing machine of claim 20, wherein the first bore has a length along its rotational axis of approximately 30 to 70 percent of the length of the second bore along its rotational axis.

24. The printing machine of claim 19, wherein said sleeve comprises a self lubricating material.

25. The printing machine of claim 19, wherein said self lubricating material comprises sintered bronze.

26. The printing machine of claim 19, wherein said sleeve comprises an electrically conductive material.

27. The printing machine of claim 19, wherein said electrically conductive material comprises carbon.

* * * * *